United States Patent [19]

Haacke et al.

[11] Patent Number: 5,266,238

[45] Date of Patent: Nov. 30, 1993

[54] NARROW BAND RADIATION FILTER FILMS

[75] Inventors: Gottfried Haacke, Fairfield; Hans P. Panzer, Stamford; Lino G. Magliocco, Shelton, all of Conn.; Sanford A. Asher, Pittsburgh, Pa.

[73] Assignee: American Cyanamid Company, Stamford, Conn.

[21] Appl. No.: 632,694

[22] Filed: Dec. 24, 1990

[51] Int. Cl.$^5$ .............................. F21V 9/00; G02B 5/24
[52] U.S. Cl. ................................... 252/582; 359/296; 359/885; 359/886
[58] Field of Search .............. 252/582, 584, 587, 588, 252/589; 359/885, 886, 296

[56] References Cited

U.S. PATENT DOCUMENTS

| | | | |
|---|---|---|---|
| 4,451,412 | 5/1984 | Loiseaux | 264/1.3 |
| 4,627,689 | 12/1986 | Asher | 350/362 |
| 4,632,517 | 12/1986 | Asher | 350/362 |
| 5,131,736 | 7/1992 | Alvarez | 359/886 |

*Primary Examiner*—Philip Tucker
*Attorney, Agent, or Firm*—Frank M. Van Riet

[57] ABSTRACT

The present invention discloses a tunable, radiation filter comprising a highly ordered crystalline array of microparticles fixed in a polymerized hydrogel.

19 Claims, 6 Drawing Sheets

NARROW BAND RADIATION FILTER FILMS

This invention was made with Government support under Subcontract Number 3382-1 awarded by University of Pittsburgh under Department of the Air Force Prime Contract Number F33615-88-C-5432. The Government has certain rights in this invention.

FIELD OF THE INVENTION

The invention relates to improvements in narrow band radiation filters. More particularly, the invention provides a tunable filter comprising a highly ordered crystalline array of microparticles fixed in a polymerized film. This filter has the ability to selectively diffract and thus filter a narrow band of radiation from a broader band of incident radiation. Moreover, the band of radiation filtered may be varied, thereby giving rise to a "tunable" filter.

CROSS REFERENCE TO RELATED APPLICATIONS

This application is related to commonly assigned U.S. Ser. Nos. 07/601,544 pending & 07/601,977 pending.

BACKGROUND OF THE INVENTION

Crystalline colloidal narrow band radiation filters were described in U.S. Pat. Nos. 4,627,689 and 4,632,517, patented Dec. 9, 1986 and Dec. 30, 1986, respectively, to Sanford A. Asher. In accordance with the inventions described therein, electrically charged particles were dispersed in a dielectric liquid to form a colloidal dispersion. The liquid dispersion was contained in a thin planar cell within walls of transparent material such as methacrylate plastic, coated glass or quartz.

The highly ordered crystalline arrangement of colloidal particles that is needed for narrow band diffraction was obtained through use of a combination of optimum conditions for making and containing the colloidal suspension. A narrow band of radiation, less than 20 nm in width, supposedly could be selectively diffracted by the colloidal array filters described by Asher. In some preferred embodiments, Asher stated that more than 99% of radiation in a band width of less than 5 nm could be diffracted while more than 80% of the intensity of adjacent wavelengths was transmitted.

In the crystalline colloidal arrays described by Asher, electrically charged microspheres of polystyrene were suspended in a dielectric liquid, preferably in water, and the electrical interaction between charged particles in the suspension formed the crystalline array of the particles. In thin layers of such colloidal suspensions, contained in thin cells within walls of plastic or coated glass or quartz, a highly ordered crystalline array was achieved. The high degree of ordering of polystyrene microspheres within the crystalline colloidal structure was achieved by careful cleaning of the microspheres and the liquid medium to remove electrolytes and surfactant impurities therefrom and by using microspheres of uniform particle size to obtain a monodisperse suspension.

The wavelength of the light diffracted in such colloidal arrays is determined by the lattice spacing in the crystalline colloidal structure which in turn is determined by the size of the dispersed particles and the concentration of the colloidal particles in the medium. The band width of the diffracted light is narrowed as the degree of crystalline order in the suspension is increased.

The major deficiency associated with the colloidal arrays disclosed by Asher is their fragility. The lattice of the array may be destroyed when subjected to shock, temperature variations and ionic influences. This deficiency renders the arrays useless in filter applications.

The Asher U.S. Pat. No. 4,627,689, mentioned above, also described a technique for making a filter in liquid medium with a concentration gradient, "and then 'freezing' the nonuniform condition, e.g., by polymerization techniques." No further description of a filter embodying that structure, nor of any "polymerization technique" was described.

U.S. Pat. No. 4,451,412, patented May 29, 1984 to B. Loiseaux et al. describes a process for producing diffracting phase structures in a medium formed of microspheres of polystyrene suspended in a polymerizable liquid. An elementary holographic image was formed in the suspension by interference patterns. The image was then fixed by polymerization of the medium. For suspensions in organic liquids, the use of polymerizable acrylic monomers was described. For suspensions in aqueous medium, the use of water-soluble monomers, particularly acrylamide monomers, with diazo free radical initiators was described.

It has been found that a highly ordered crystalline array of polystyrene microspheres in a aqueous medium, as described by the Asher patents cited above, can not be fixed by the polymerization techniques described by the Loiseaux patent mentioned above. Because of the ionic properties of the diazo polymerization initiators described in U.S. Pat. No. 4,451,412 they prevent the formation of a highly ordered crystalline array in the liquid medium.

BRIEF DESCRIPTION OF THE FIGURES

The present invention can be more readily understood through reference to attached FIGS. 1-6 which graphically present absorption spectra for both filters within the scope of the present invention and filters used for comparision therewith.

SUMMARY OF THE INVENTION

Figure 1:
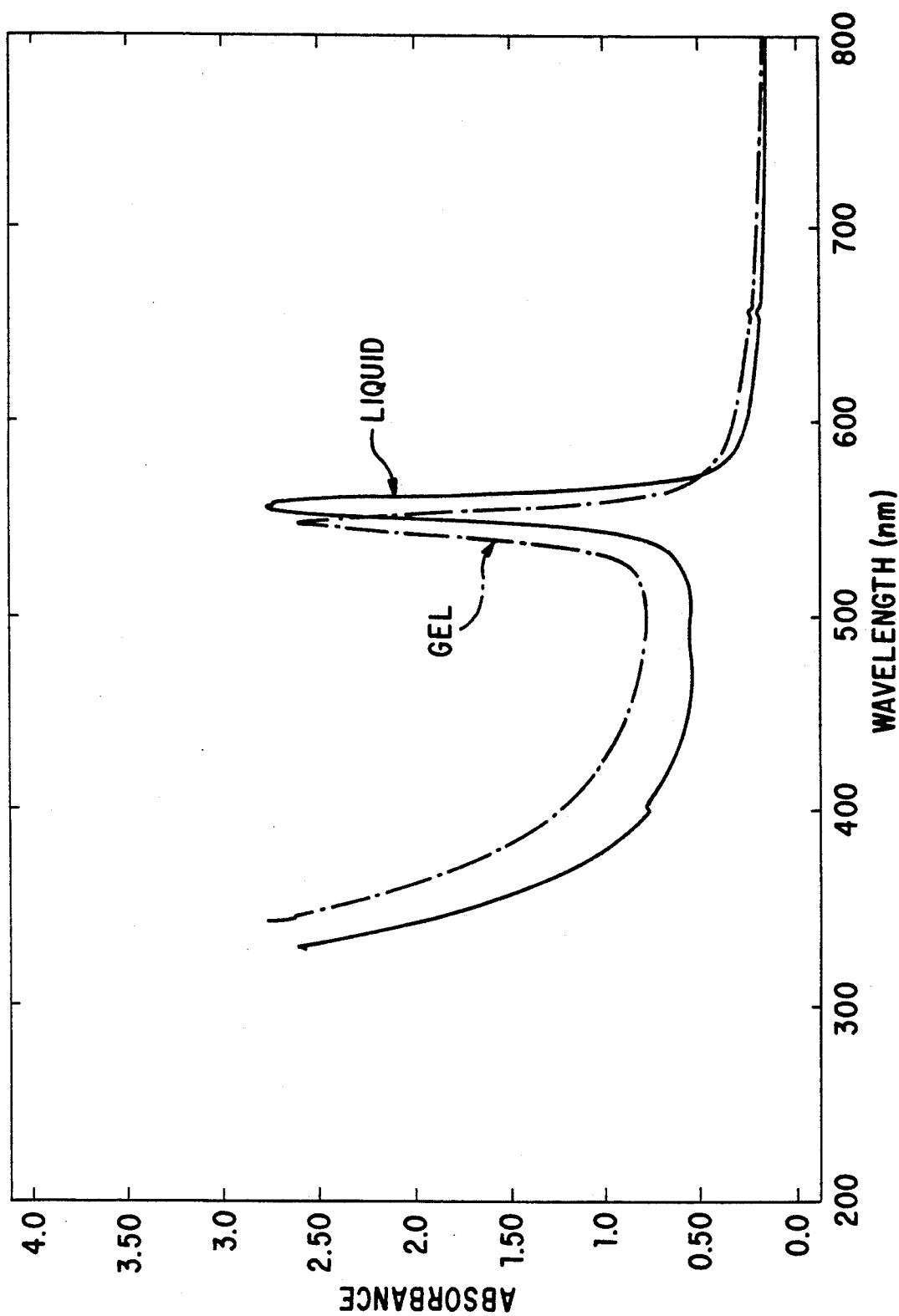

The present invention is directed to a tunable, narrow band radiation filter comprising a crystalline colloidal array of charged particles which array has been formed in a thin film of aqueous medium and has been fixed in a hydrogel film formed by polymerization of a mixture in said aqueous medium of a water-soluble crosslinking agent and acrylamide (or a mixture of acrylamide and a water-soluble comonomer);

a first and second fixation means securing first and second portions of said filter, and tensioning means to impose a variable force on said filter between said first and second fixation means.

DESCRIPTION OF THE INVENTION

The crystalline array utilized in the practice of the present invention may be that described by Asher in the above-mentioned U.S. Pat. No. 4,627,689. While such polystyrene microspheres may be obtained commercially, a preferred colloidal array is made with microsphere particles obtained by copolymerization of styrene and a water-soluble vinyl or acrylic comonomer which bears an anionic group that cannot be easily hydrolyzed. The preferred anionic group is sulfonate. A preferred comonomer for this use is 1-sodium,1-allyloxy-2-hydroxypropane sulfonate (COPS-1). Other comonomers bearing anionic groups for copolymerization with styrene to make an emulsion of copolymerized microspheres for use in the invention include the sodium salt of styrene sulfonate, 2-acrylamido-2-methylpropane sulfonate, 3-sulfopropyl methacrylate potassium salt, and vinyl sulfonate.

In the copolymerized emulsion used in the production of the colloidal array, the anionic property of the polymerized comonomer has the effect of increasing surface charge density on the suspended copolymer particles. The increased surface charge seemingly intensifies electric forces which form and maintain the crystalline array in the aqueous medium, and thus strengthens the crystalline array in the liquid medium. One advantage of the use of such comonomer is that the copolymer emulsion will form into a highly ordered crystalline array much faster than a polystyrene emulsion. Another advantage is that the strengthened array can better resist stress during formation of a crosslinked hydrogel in the aqueous medium.

Regarding formation of the polymer to "fix" the crystalline array, we have found that combinations of acrylamide and crosslinking comonomers, which can be dissolved with an initiator in the aqueous medium in which a crystalline array is suspended are required for the practice of the present invention.

A suspension of electrically charged microspheres in an aqueous solution of acrylamide as the sole polymerizable monomer, when using charge-neutral initiators, can retain the crystalline order before polymerization. But upon polymerization of the dissolved monomer, a hydrogel film does not develop. The crystalline array in the resulting viscous liquid, if not lost entirely, is dissipated to a point that the degree of diffraction is reduced significantly. Use of a crosslinking comonomer is therefore necessary. The presence of a crosslinker leads to gels with low polymer entanglement densities (open pore structures), essential for accommodating colloidal crystals.

The acrylamide reactant used in the practice of the present invention may be partially replaced with a water soluble comonomer or mixtures thereof. Comonomers that form hydrogels are well known in the art and include, for example, vinyl pyrrolidone and hydroxyethylmethacrylic acid ester. Such comonomers may be used in place of up to about 70% by weight of the acrylamide reactant, preferably no greater than about 50% by weight. The term "acrylamide" as used herein should therefore be understood to include partial replacement with such comonomers unless otherwise specifically stated.

The crosslinking agents used with acrylamide have a crosslinking moiety which, upon polymerization to make the hydrogel, forms a crosslinked polymer network in the hydrogel and this tends to fix the suspended particles in the array. The crosslinking agent also assists formation of the hydrogel and strengthens the film so that a self supporting film can be made. One preferred crosslinking agent for use with acrylamide in the practice of the invention is methylenebisacrylamide. Other crosslinking agents that can be used are methylenebismethacrylamide and the like. Hydrogel films can be formed with some retention of the crystalline structure when a little as one part in one hundred parts by weight of the comonomer mixture is the crosslinking agent. Better retention of the crystalline structure is obtained with increasing proportions of the crosslinking agent in the polymerizable mixture and excellent retention of structure, with consequent excellent retention of the narrow band diffraction capability, using a ratio (on the basis of weight) of crosslinking agent to acrylamide of from about 1:5 to about 1:12. Preferred are ratios of about 1:8 to about 1:12. Especially preferred is a ratio of about 1:9.

In addition to monomer ratios, it has further been found that the total solids level of said monomers present in said aqueous solution is of significant influence on the properties of the filter produced therewith. Moreover, the total solids level and the monomer ratios have been found to be somewhat interdependent. Solids levels may vary from about 2 wt. % at a monomer ratio of about 1:49 to greater than about 20% at a monomer ratio of about 1:15. In respect to the preferred ratios of monomers, solids levels ranging from about 3 to about 9 wt. % are preferred.

The acrylamide, optional comonomer and crosslinking agent can be dissolved with the initiator in the aqueous medium for the crystalline array without disturbing the crystalline order. The mixture can be polymerized by action of the initiator upon exposure to actinic radiation to form a hydrogel in which the crystalline array is fixed and preserved. A film of this hydrogel with the fixed crystalline array can then function as a diffracting filter. In preferred embodiments, upon polymerization of the dissolved comonomers, the crystalline order is preserved in the hydrogel to the extent that it can selectively diffract a narrow band with practically the same effectiveness as before polymerization.

A photosensitive, charge-neutral, free radical initiator maybe used in the practice of the present invention. A heat sensitive free radical initiator which can be activated at moderate temperature may also be employed, as such, or in combination with activating light. Some suitable free radical initiators for use in the invention include the preferred benzoin methyl ether, as well as benzoin ethyl ether, succinic acid peroxide, 2-hydroxy-2-methyl-1-phenylpropan-1-one, 4-(2-hydroxyethoxy)-phenyl-(2-propyl)ketone, 2,2'azobis(2,4-dimethyl-4-methoxyvalero)nitrile, and azobisisobutyonitrile, for example. The initiator may be dissolved in a water soluble solvent such as isopropyl alcohol or ethylene glycol, to improve dispersion of the initiator in the aqueous solution. Very small catalytic amounts of the initiator, usually less than one percent by weight of the solution are effective for the purpose of the invention.

Initiators are preferably employed in amounts ranging from 0.001 to about 1 wt. % based upon total weight of the monomer(s). It is especially preferred to employ initiators in an amount of about 0.01 on the same basis. One object of the invention is to provide a highly ordered crystalline colloidal array filter of the kind described, suspended in a thin film of a polymerized hydrogel instead of a dielectric liquid medium. One advantage of the invention is that the highly ordered crystalline array of colloidal particles, after it is fixed in the hydrogel by polymerization, no longer depends on the interactive electric forces of charged particles to maintain the crystalline structure. The fixed array in the polymerized medium is no longer sensitive to changes in temperature (such as freezing) or to electrical fields or to mechanical shock, which could cause the crystalline array in liquids to change or dissipate.

Another advantage of the invention is that the filter, as a thin layer of the dispersion in a hydrogel, in some preferred embodiments can be a self-supporting polymeric film or membrane, without the need for cell walls to contain the filter.

It has further been found that the addition of simple sugars, such as sucrose, fructose, lactose and glucose, or other polyhydric alcohols, such as ethylene and propylene glycols, further enhances the stability of the filters to freezing temperatures which heretofore would totally destroy the filtering ability of said filter even following its thaw. Such sugars and polyols may be added in amounts ranging from 0.01 weight % based upon the weight of the acrylamide up to the limit of their solubility in said aqueous medium. It is preferred that such sugars and polyols be present in amounts ranging from about 0.01 to about 25 weight % on the same basis. It is especially preferred that such sugars and polyols be present in amounts ranging from about 0.1 to about 25 weight % on the same basis.

The present invention comprises first and second fixation means which are secured to first and second portions of said filter. The identity of said fixation means and the method of attachment to said filter is not critical and will vary according to the physical dimensions of the filter and the environment in which the filter it is to operate. However, it is preferred that the fixation means comprise relatively broad areas of attachment, such as linear strips rather than mere attachment points. In this way, a larger area between said first and second fixation means would be subjected to substantially the same tension providing for a large filter area diffracting substantially the same wavelength of radiation. Large fixation means, such as strip, also produce less localized stress upon the filter.

The fixation means may be clamped over the filter, effectively sandwiching it therebetween. Alternately, the fixation means may be secured to the film through the use of an adhesive or other bonding agent.

The present invention further comprises a tensioning means which imposes a variable force or tension on the filter between said first and second fixation means. This is accomplished by varying the distance between said first and second fixation means, thereby imposing a tension on the filter located therebetween. While the identity and exact construction of the tensioning means is not critical, it should be capable of maintaining a given tension for an extended period of time, thereby allowing the filter to stay "in tune." Preferably, the tensioning means comprises a piezoelectric transducer whose displacement can be controlled by the application of an electric field. Equally suitable are magnetostrictive transducers or capacitively coupled membranes, such as a loudspeaker membrane.

In a most preferred embodiment, the present invention comprises an automated laser scanner which monitors a predetermined band of incident radiation and activates the tensioning means to impart sufficient tension upon the filter such that the filter defracts the detected band of radiation. An additional sensor maybe located behind the filter to confirm diffraction of said radiation and to aid in the fine adjustment of said tensioning means.

EXAMPLE 1

The following procedure is used to prepare a preferred copolymer latex for use in the invention. Three solutions are premixed to be used for the emulsion polymerization. These are as follows:

| | |
|---|---|
| 1. Solution for the Aqueous Phase | |
| Distilled Water | 103.50 gms. |
| Sodium Bicarbonate | 0.14 gms. |
| Aerosol MA-80 | 2.10 gms. |
| Water Soluble Comonomer (Cops-1) (2.36 gms. of a 40% stock solution were used for the latexes) | variable |
| 2. Solution for the Monomer Phase | |
| Styrene (distilled) | 45.15 gms. |
| Divinylbenzene (distilled) | 2.50 ml |
| 3. Initiator Solution | |
| Potassium Persulfate | 14.40 gms. |
| Distilled Water | 180.00 gms. |

The aqueous phase is placed in the reaction flask and heated to 95° C. in a constant temperature water bath. The monomer phase is added by a dropping funnel in a steady stream and the two phases are allowed to equilibrate to reaction temperature. A continuous stream of nitrogen is bubbled through the mixture until stirring of the mixture has begun. In a separate flask, the initiator solution is also purged of oxygen with bubbling nitrogen. Using a syringe, 8.5 ml of the initiator solution is injected into the reaction flask through a septum. The mixture is continuously stirred at a constant rate of 200 rpm, using a constant torque stirrer for six hours. Throughout the reaction, nitrogen blankets the mixture.

Upon completion of the reaction, the solution is filtered through glass wool to remove coagulum and large macroscopic particles, then dialyzed against distilled water containing mixed bed ion exchange resin for 2 to 4 weeks. The dialyzed latex has an average particle diameter of 107 nm, a polydispersity index (PDI) of 1.039, surface charge density of 9.21 uC/cm and a solids content of 23.2 percent by weight. This dialyzed copolymer latex is used in all of the following Examples with the exception of Example 5 where a similar latex is utilized.

EXAMPLE 2

A solidified colloidal array filter was made using 5.5 ml of the dialyzed copolymer latex described above combined with 5.0 ml of an aqueous comonomer/crosslinker solution, 2.0 ml of a photoinitiator solution and 7.5 ml of distilled water. The comonomer/crosslinker solution consists of a 40% solids aqueous solution of acrylamide(AMD) and N,N methylenebisacrylamide (MBA) in a 9/1 AMD/MBA ratio (10% MBA). The photoinitiator solution consists of 0.2 grams of benzoin methyl ether (BME) in 99.8 grams of ethylene glycol. In this mixture, microspheres constitute about 6.3% by wt and the comonomers about 10% by wt. of the mixture. The mixture is placed in a small glass vial along with particulate mixed bed ion exchange resin (Dowex MR-12) and stirred using a vortex mixer. The solution is placed under vacuum for 5 minutes to remove oxygen from the solution.

A portion of the degassed solution is decanted from the vial and placed dropwise on a cleaned quartz plate. A second cleaned quartz plate is then placed on top, spreading the latex/monomer solution between the plates to form an enclosed film of the liquid between the plates. The excess liquid is removed and the assembly is placed under a BlackRay Longwave UV ultraviolet lamp (UVP Inc., San Gabriel, Calif.) for ten minutes causing polymerization and the consequent forming of a hydrogel. After the crystalline array is formed in the thin film between the plates and before the liquid suspension is polymerized, an absorbance spectrum for the array is measured in the visible light range. A narrow diffraction band is observed at about 555 nm in which more than 99% of the radiation is diffracted. Thus the suspension in the monomer solution was found to be an efficient narrow band filter. After polymerization, another absorbance spectrum is measured and the diffraction pattern for the hydrogel is slightly shifted to 547 nm maximum but otherwise is practically the same as that for the liquid suspension. The absorbance spectra for those measurements are shown in FIG. 1. This demonstrates that the highly ordered crystalline array is preserved in the hydrogel. The polymerized film is removed from between the plates and remains a self supporting flexible film which can be used as a narrow band radiation filter.

COMPARATIVE EXAMPLE 1

An attempt to make a solidified colloidal array hydrogel filter was made using a latex described in Example 1 above, which has been diluted with deionized water to a solids content of 9.0 percent, and using acrylamide as the water soluble monomer without a crosslinker. In this case 1.0 ml. of the latex was mixed with 1.25 ml. of 40% solids stock solution of of AMD in distilled water along with 0.25 ml of a 0.2% solution of BME in ethylene glycol. This results in a final AMD concentration of 20% solids by weight.

After the application of UV radiation for about 16 hours with the UV source used in Example 2, the system did not solidify into a self-supporting film. The absorbance spectra, before and after exposure, in FIG. 2. No diffraction peak is obtained after exposure to the UV source, indicating that the crystalline array no longer exists. This indicates the disordering effect that a concentrated, crosslinker-free, highly entangled polymer network can have on the colloidal array crystal.

EXAMPLE 3

A solidified colloidal array hydrogel filter was made using 1.2 ml of a diluted latex from Example 1 combined with 0.5 ml of an aqueous monomer/crosslinker solution and 0.1 ml of a photoinitiator solution. The latex is the same as that described in Example 1 but it has been diluted to solids content of 11.9 percent by weight. The monomer/crosslinker solution consists of 40% aqueous solution of acrylamide(AMD) and N,N methylenebisacrylamide(MBA) in a 49/1 AMD/MBA ratio by wt (2%MDA). The photoinitiator solution consists of 0.2 grams of 0.2% by wt benzoin methyl ether (BME) in isopropyl alcohol. The mixture contains 9% by wt of microspheres and 20% of AMD. The mixture was purified with ion-exchange resin and degassed by the procedures described in Example 2.

Figure 3:
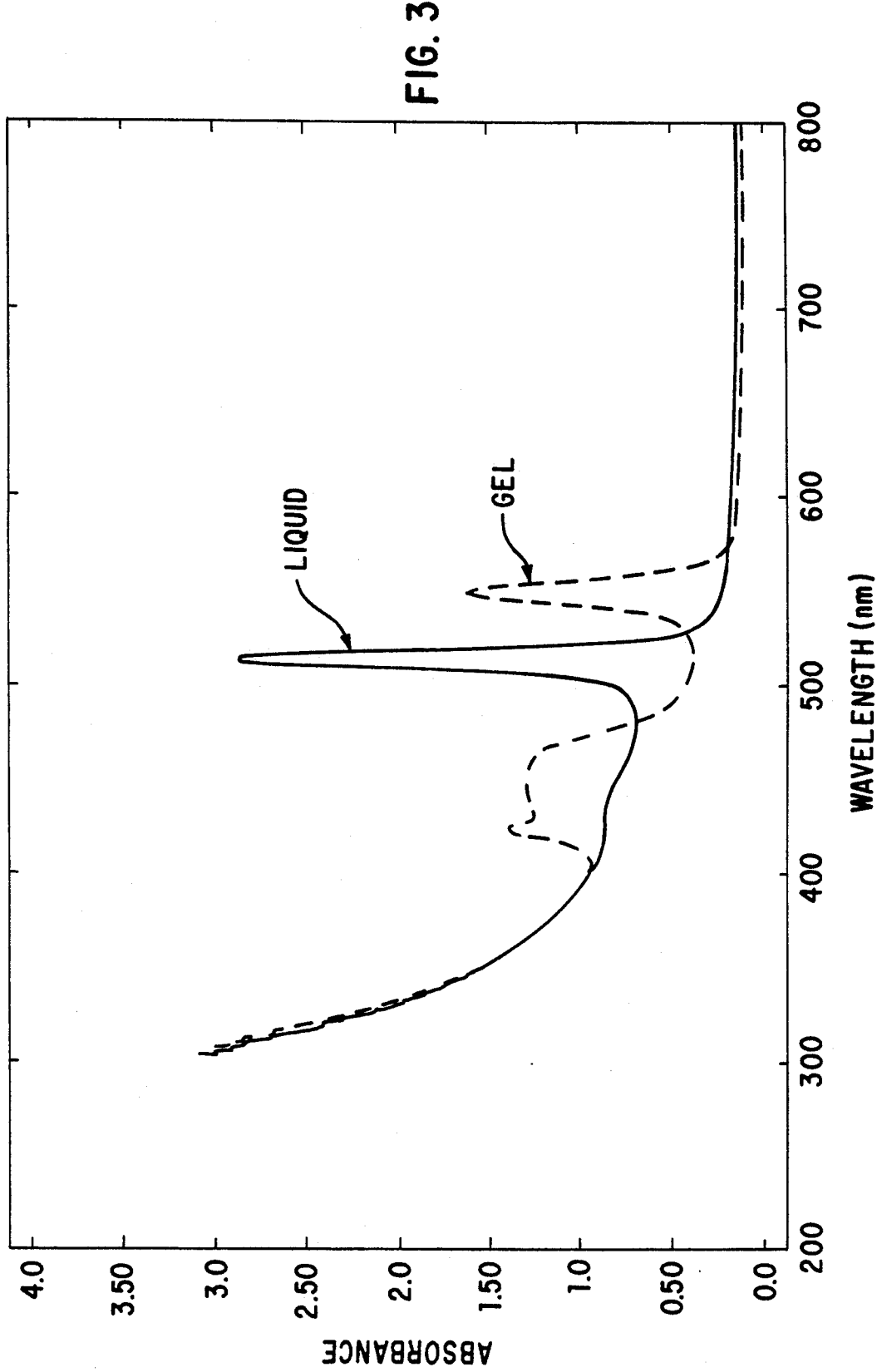

A portion of the degassed solution was placed dropwise on a cleaned quartz plate, and a second cleaned quartz plate was placed on top spreading the latex/monomer solution between the plates. The excess was removed and the solution was exposed to UV radiation as in Example 2. On polymerization, a hydrogel film is obtained. Absorption patterns for the solution before and after exposure are shown in FIG. 3. The double peak diffraction pattern for the polymerized film shows that a crystalline array is retained in the hydrogel, but with some distortion which causes the double peak pattern.

EXAMPLE 4

Figure 2:
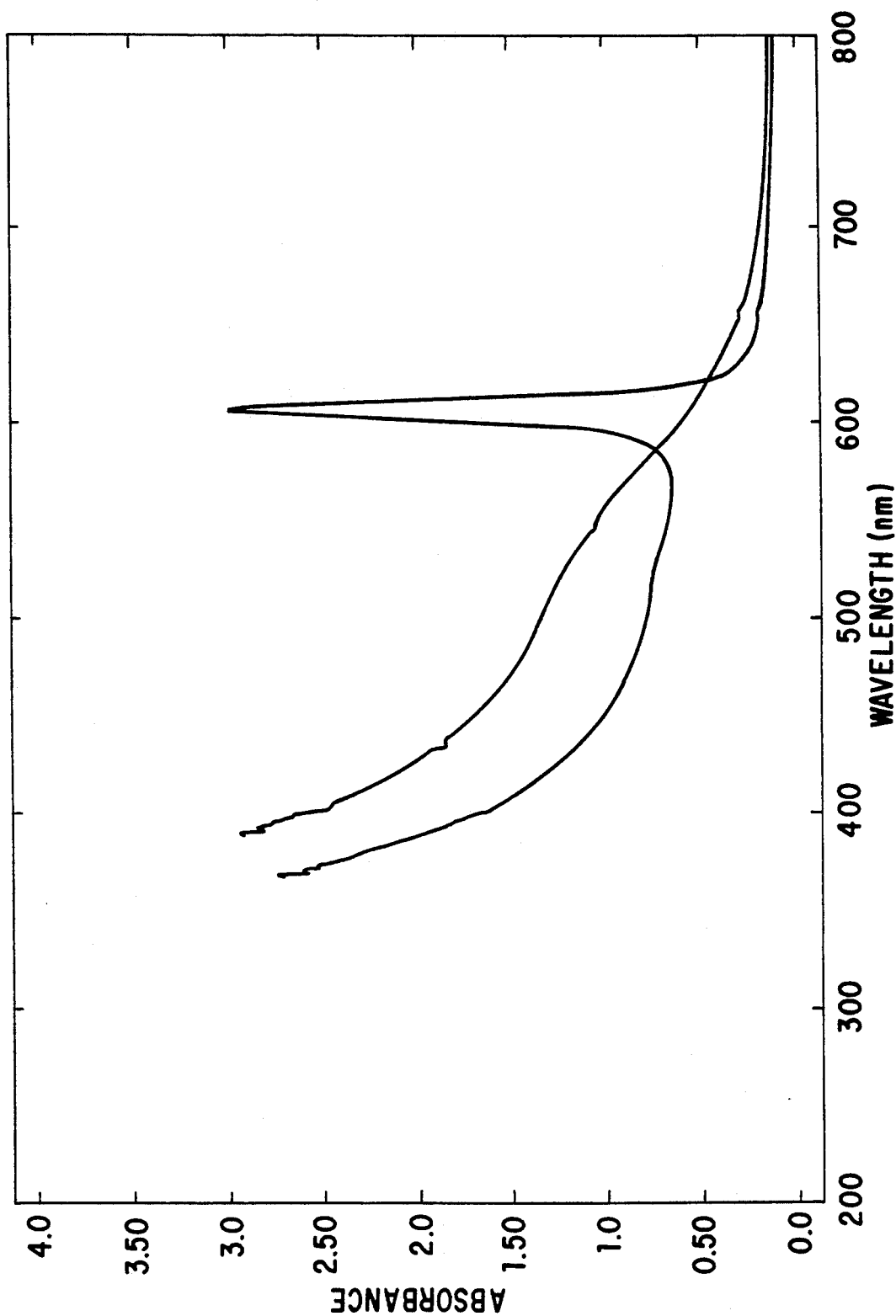
Figure 4:
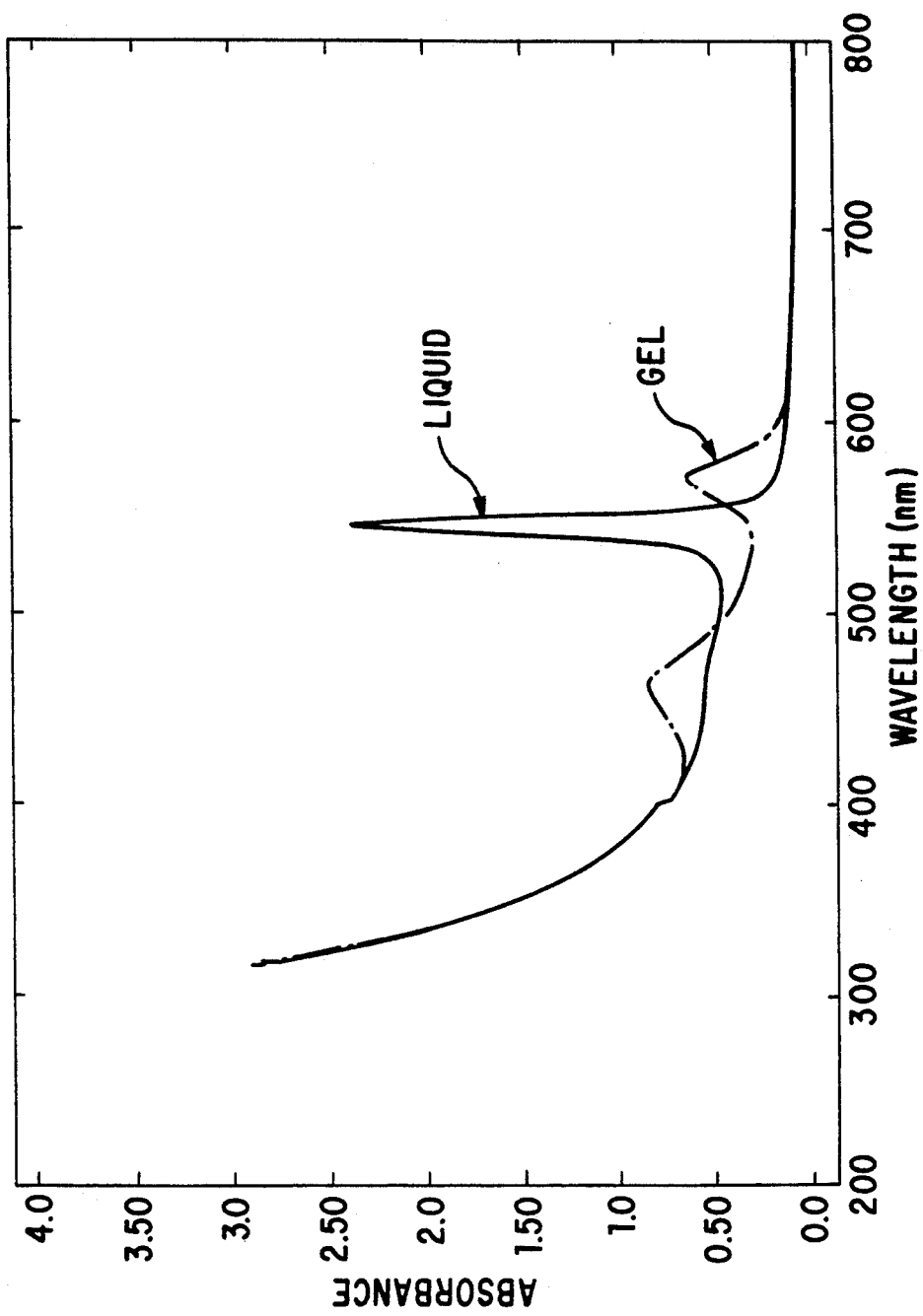

A solidified colloidal array filter is made using 0.8 ml of the latex from Example 1 combined with 1.0 ml of an aqueous 40% by wt solution of 99/1 AMD/MBA solution (1% MDA) and 0.2 ml of the 0.2% photoinitiator solution used in Example 2. The mixture contains 9.2% by wt of microspheres and 20% by wt of comonomers. The mixture is purified and formed into thin film and irradiated as described in the Examples above. Exposure time is ten minutes. A hydrogel film is formed. Absorption spectra before and after polymerization are shown in FIG. 4. Comparison of FIGS. 2 and 4 shows that even one percent of the crosslinking comonomer with acrylamide can cause a hydrogel to form and retain at least some crystalline structure as shown by the two diffraction peaks in the spectrum for the hydrogel film in FIG. 4.

EXAMPLE 5

Figure 5:
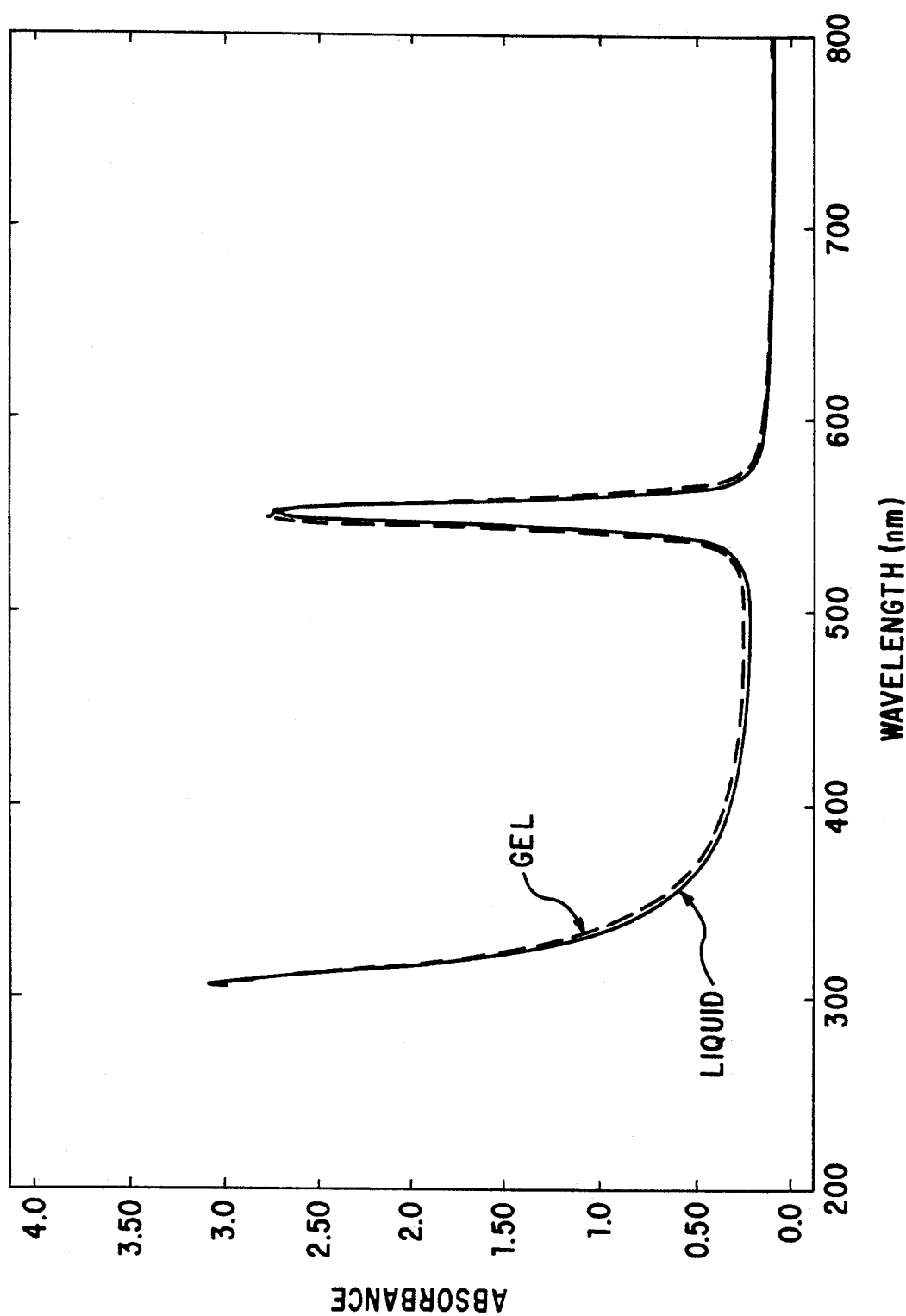

A solidified colloidal array filter is made using 1.8 ml of dialyzed copolymer latex having the following properties: average particle diameter=109 nm, PDI=1.02, solids content=14.2 wt. %). The latex is combined with 0.5 ml of an aqueous comonomer/crosslinking agent solution (12/1 AMD/MBA, 20% by weight), 0.2 ml of a photoinitiator solution and 0.5 ml of an aqueous sucrose solution (57.6% by weight). The mixture is then purified and formed into a thin film which is irradiated as described in the above Examples. The exposure time for such irradiation is ten minutes and a hydrogel is formed. Adsorption spectra before and after polymerization are shown in FIG. 5. No change in the absorption spectra is found after polymerization.

The filter is then subjected to temperatures of from $-15$ to $-20$ degrees Centigrade overnight. Once thawed, the filter is found to substantially retain its initial filtering capabilities.

EXAMPLE 6

Figure 6:
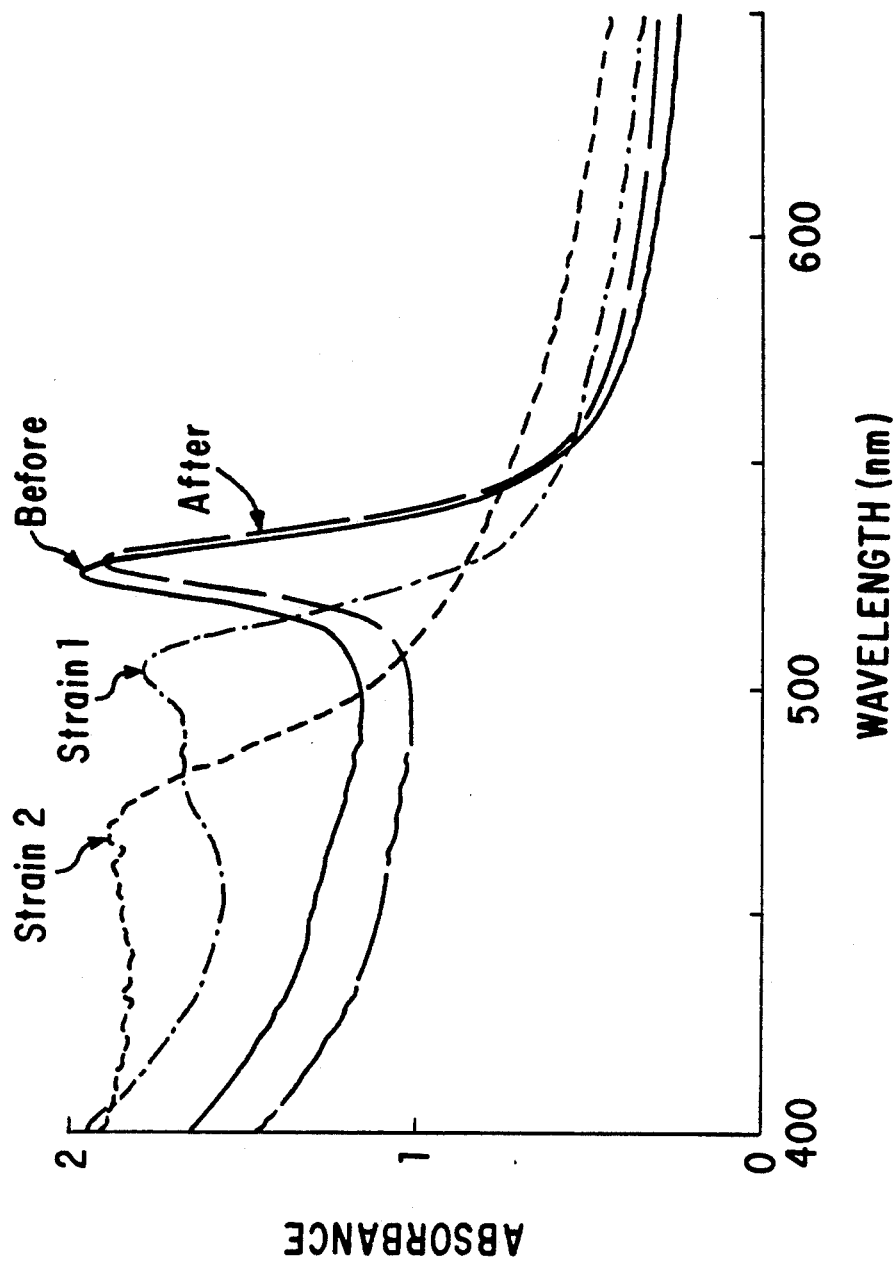

A filter was prepared in a fashion similar to that stated in Example 1. A rejection peak was found to exist at 532 nm (lamdba) while no tension was imposed on the filter. This peak is labeled "Before" on attached FIG. 6. First and second fixation means in the form of narrow strips of poly(methylmethacrylate) were then attached to the filter. Upon application of mechanical stress to the filter, the rejection peak shifted to smaller wavelengths. This shift of about 500 nm is labeled "Strain 1" on FIG. 6.

Upon the application of increased levels of applied stress, an additional shift of approximately 465 nm was found to occur. This is shown on FIG. 6 as "Strain 2".

Upon the ceasation of applied stress to the filter, the absorbance of the filter was found to have shifted slightly from its initial value. This peak is labeled "After" on FIG. 6.

We claim:

1. A tunable narrow band filter comprising a crystalline colloidal array of charged particles of a copolymer of styrene and a comonomer selected from the group consisting of 1-sodium, 1-allyloxy-2-hydroxylpropane sulfonate; styrene sulfonate; 2-acrylamido-2-methylpropane sulfonate; 3-sulfopropylmethacrylate potassium salt and vinyl sulfonate fixed in a self-supporting film of polymeric hydrogel wherein the polymer in the hydrogel film is a polymer comprising acrylamide, an optional water-soluble comonomer of vinyl pyrrolidone or hydroxyethylmethacrylic acid ester and N,N-methylenebisacrylamide, first and second fixation means securing first and second portions of said hydrogel, and tensioning means to impose a variable force on said hydrogel between said first and second fixation means.

2. The radiation filter defined by claim 1 wherein the water soluble comonomer is present in an amount less than about 70% by weight of the total weight of the acrylamide and said comonomer.

3. The radiation filter defined by claim 1 wherein the water soluble comonomer is present in an amount less than about 50% by weight of the total weight of the acrylamide and said comonomer.

4. A tunable narrow band radiation filter comprising a crystalline colloidal array of charged particles of a copolymer of styrene and a comonomer selected from the group consisting of 1-sodium, 1-allyloxy-2-hydroxylpropane sulfonate; styrene sulfonate; 2-acrylamido-2-methylpropane sulfonate; 3-sulfopropyl methacrylate potassium salt and vinyl sulfonate which has been formed in a thin film of aqueous medium and fixed in a hydrogel film formed by polymerization of a mixture in said aqueous medium acrylamide, an optional water-soluble comonomer of vinyl pyrrolidine or hydroxyethylmethacrylic acid ester and a water-soluble cross-linking agent consisting of N,N-methylenebisacrylamide, first and second fixation means securing first and second portions of said hydrogel, and tensioning means to impose a variable force on said hydrogel between said first and second fixation means.

5. The radiation filter of claim 4 wherein the crosslinking agent is present in quantities of at least one part per one hundred parts by weight of the mixture of crosslinking agent and acrylamide.

6. The radiation filter of claim 4 wherein polymerization is initiated by photoactivation of a charge neutral, free radical photoinitiator in said aqueous medium.

7. The radiation filter of claim 4 wherein the polymerization is initiated by the application of heat to a charge neutral, free radical heat sensitive initiator in said aqueous medium.

8. A radiation filter defined by claim 6 wherein the photoinitiator is benzoin methyl ether.

9. The radiation filter of claim 6 wherein the photoinitiator is present in amounts ranging from about 0.01 to about 1 wt. % based upon the total weight of acrylamide, or acrylamide and water soluble comonomer if said comonomer is present.

10. The radiation filter of claim 6 wherein the photoinitiator is present in amounts ranging from about 0.01 to about 0.1 wt. % based upon the total weight of acrylamide, or acrylamide and water soluble comonomer if said comonomer is present.

11. The radiation filter of claim 4 wherein the aqueous mixture contains a ratio of acrylamide, or acrylamide and water soluble comonomer, to crosslinking agent ranging from about 1:5 to about 1:12 on a weight basis.

12. The radiation filter of claim 11 wherein the aqueous mixture contains a ratio of acrylamide, or acrylamide and water soluble comonomer, to crosslinking agent ranging from about 1:8 to about 1:12 on a weight basis.

13. The radiation filter of claim 4 wherein the aqueous mixture comprises from about 2 to about 20 wt. of acrylamide.

14. The radiation filter of claim 13 wherein the aqueous mixture comprises from about 3 to about 9 wt. % of acrylamide.

15. The radiation filter of claim 11 wherein the aqueous mixture comprises from about 3 to about 9 wt. % of acrylamide.

16. The radiation filter of claim 13 wherein the aqueous mixture further comprises a water soluble comonomer.

17. The radiation filter of claim 14 wherein the aqueous mixture further comprises a water soluble 18. The radiation filter of claim 15 wherein the aqueous mixture further comprises a water soluble comonomer.

19. The radiation filter of claim 4 wherein said fixation means comprise strips secured to said hydrogel by either clamping means or an adhesive bonding agent.

* * * * *